July 4, 1967 F. J. CARSON ET AL 3,329,494
APPARATUS FOR PRESS BENDING GLASS SHEETS
Filed Oct. 14, 1963 2 Sheets-Sheet 1

INVENTORS
Frank J. Carson and
BY George F. Ritter, Jr.
Nobbe & Swope
ATTORNEYS

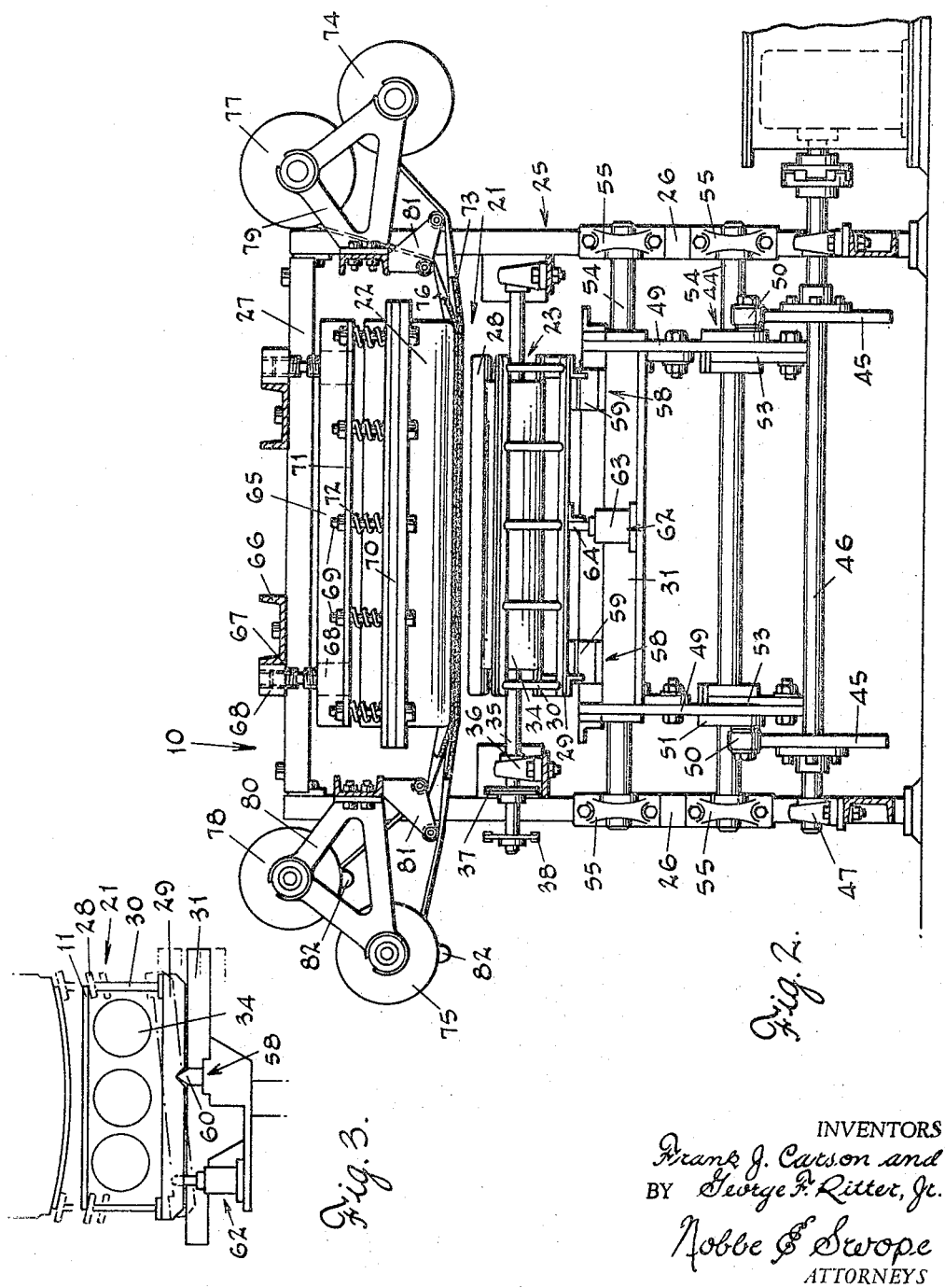

United States Patent Office 3,329,494
Patented July 4, 1967

3,329,494
APPARATUS FOR PRESS BENDING
GLASS SHEETS
Frank J. Carson and George F. Ritter, Jr., Toledo, Ohio,
assignors to Libbey-Owens-Ford Glass Company,
Toledo, Ohio, a corporation of Ohio
Filed Oct. 14, 1963, Ser. No. 315,788
12 Claims. (Cl. 65—287)

The present invention relates generally to the production of curved sheets of glass and more particularly to new and improved apparatus for bending glass sheets.

Curved sheets of glass are widely used as glazing enclosures, particularly as windows in vehicles such as automobiles or the like. To be suitable for such applications, the curved sheets must be bent to rather precisely defined curvatures dictated by the size and configuration of the opening in which they are to be mounted and by the overall styling of the vehicle. At the same time, it is important that the major surfaces of the sheets, that is, the surfaces within the viewing area of the window, be free of mars or defects which would interfere with clear vision through the window.

One procedure for producing curved glazing closures of the above character includes heating substantially flat sheets of glass to an elevated temperature at which the glass softens and thereafter pressing the heat softened sheets between complemental, interfitting shaping surfaces formed to the desired curvature of the finished sheets.

After the sheets are bent or formed in the above manner, their temperature is reduced whereupon the glass sets and the sheet retains the curvature imparted by the shaping surfaces. The rate at which the temperature of the glass is reduced affects the physical characteristics of the finished bent sheets. In this connection, as is well known, when a body of glass is rapidly cooled from a temperature near its softening point to a temperature below the annealing range of glass, a process known as tempering, the outer surface or "skin" of the glass body is placed under compressive stress thereby increasing the impact resistance and improving the breaking characteristics of the body of glass. Glass sheets intended for use as vehicle windows are commonly treated in this manner.

The primary object of the present invention is to provide an improved apparatus for bending sheets of the above character.

Another object is to provide an apparatus for bending glass sheets to precisely defined curvatures without marring the surfaces of the sheets.

Another object is to provide apparatus for bending a number of sheets in a continuous manner conducive to mass production of curved windows.

Other objects and advantages of the invention will become more apparent during the course of the following description when taken in connection with the accompanying drawings.

In the drawings, wherein like numerals are employed to designate like parts throughout the same:

FIG. 2 is a sectional view taken along line 2—2 of FIG. 1; and

FIG. 3 is a fragmentary schematic view of the mold parts showing them in their various positions.

Figure 1:
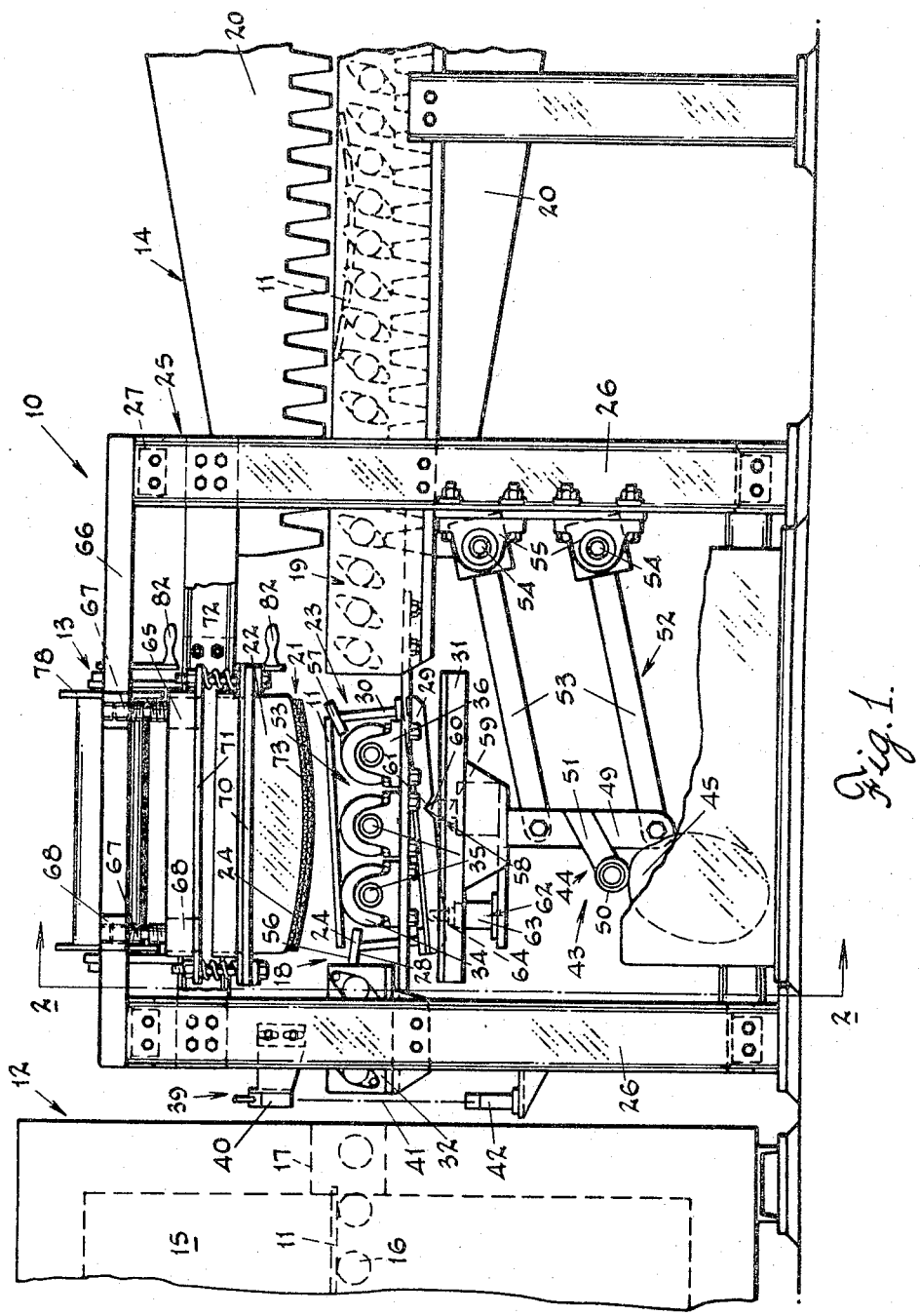
FIG. 1 is a side elevational view of a bending apparatus incorporating the novel features of the present invention with parts broken away and shown in section.

In the production of curved windows for vehicles in relatively large quantities and on a commercial basis, the glass sheets are heated, bent and subsequently tempered in a substantially continuous procedure. To this end, the sheets are moved successively, one by one, along a predetermined path through a heating area, a bending area and a chilling or tempering area, which areas are contiguous so that each sheet, upon being moved through one area, passes immediately into and through the following area. With this procedure, the heat imparted to the sheet to bring it to the bending temperature is utilized in the tempering process.

In the drawings, for purposes of illustration, the present invention is shown embodied in an apparatus 10 for bending and tempering glass sheets by a continuous commercial process similar to that described above. The apparatus includes a conveyor system operable to carry glass sheets 11 along a predetermined path through a heating area A having a furnace 12 for heating the sheets to the desired temperature, a bending area B having bending means 13 for forming the sheets to the desired curvature, and a cooling area C having cooling or chilling means 14 for rapidly reducing the temperature of the sheets to produce the desired temper therein.

To facilitate describing the apparatus in detail, hereinafter the position and relative location of the various elements of the apparatus will be related to the path defined by the conveyor system and to the direction of movement of the sheets along the path through the apparatus.

In the present instance, the glass sheets 11 are heated in a tunnel-type furnace 12 having an elongated heating chamber 15 defined by refractory walls and heated by suitable burners or equivalent heating devices (not shown). The flat sheets of glass to be heated are advanced through the chamber 15 by a roller-type conveyor 16, which forms a part of the conveyor system and extends from the entrance end (not shown) to an oppositely disposed exit end of the furance. The sheets are heated during their passage through the chamber 15 and, upon emerging from an opening 17 in the exit end of the furnace, are received on another roller-type conveyor 18 which also forms a part of the conveyor system, and are moved into the bending area B where they are formed to the desired curvatures by the bending means 13.

After being bent, the sheets continue along the path and onto a third roller conveyor 19 disposed in end-to-end alignment with the conveyors 16 and 18 in the heating and bending areas to complete the conveyor system. The conveyor 19 moves the sheets through the cooling area C and past the cooling means 14 which, in the present instance, comprises blast heads 20 disposed above and below the path and operable to direct opposed blasts of cooling fluid such as air toward the conveyor 19 and against the opposite surfaces of the sheets resting thereon.

In the illustrated apparatus, the bending means 13 comprises a shaping mold 21 including male and female mold parts 22 and 23 adapted to press the heat softened glass sheets into the desired curvature. Complemental, interfitting shaping surfaces 24 are formed on opposed faces of the mold parts 22 and 23 which are movable relative to each other and to the path to bring the shaping surfaces into pressing engagement with opposite sides of the heated sheets.

The mold parts 22 and 23 are carried by a suitable supporting framework 25 which includes two upright columns 26 at each side of the path and spaced apart longitudinally along the path with corresponding columns at opposite sides of the path being transversely aligned. The columns 26 extend upwardly above the conveyor 18 and are tied together at their upper ends by horizontally disposed beams 27 extending transversely across the path and secured at their opposite ends to the aligned columns thereby to form, with the columns, a rigid box-like structure.

The mold parts 22 and 23 are carried by the frame to move relative to each other and to the path between an open position, wherein the mold parts are spaced apart with one of the mold parts 22 above the path and the other mold part 23 below the path, and a closed position wherein the mold parts are on the same side of the path and in close proximity to press a glass sheet between the shaping surfaces. While either or both mold parts may be moved in the bending operation, in the present instance, the upper mold part 22 remains substantially stationary and the lower mold part 23 reciprocates back and forth in a generally vertical plane toward and away from the upper mold part. In this manner, as a heated sheet is moved along the path into the bending area, it is displaced upwardly from the path by the lower mold part, carried into pressing engagement with the upper mold part and, thereafter, returned to the path and moved into the cooling area C.

Now, it will be appreciated that, upon leaving the furnace and entering the bending area, the glass sheets are in a heat softened condition and thus their surfaces are very susceptible to being marred by contact with the rollers of the conveyor 18. It has been observed, however, that as the sheets are moving along the conveyor, there is no appreciable marring of the sheet surfaces by the rollers and that marring to an objectionable degree only occurs when the sheets are permitted to come to rest on the rollers or if there is relative movement between the conveyor rollers and the sheet.

Based on this observation, and in order to prevent marring of the surfaces of the glass sheets, the present invention contemplates preventing the sheets from coming to rest on the conveyor rollers by lifting the sheets off the conveyor at the same time as they are brought into position between the mold parts and into proper registry with the shaping surfaces formed thereon. To this end, the lower mold part is constructed to properly locate the glass sheet relative to the shaping surfaces of the mold as the sheet is advanced into the bending area and to immediately lift the sheet off the conveyor and to support it above the conveyor until the bending cycle is initiated.

The lower mold part 23 in the present instance is of open ring-type construction having shaping surfaces which engage only the marginal portions of the glass sheets to avoid marring the portions of the undersurface of the sheet which lie within the viewing area of the finished window. To this end, the mold part is formed by bars 28 arranged in a quadrangle conforming in plan to the outline of the glass sheets and having shaping surfaces formed on their upwardly directed faces to conform, in elevation, to the curvature of the sheets when bent. The bars 28 are supported on a base 29 disposed below the conveyor 18 by upright posts 30 extending between the bars and the base and projecting through the conveyor. The base 29 is mounted on a carriage 31 in a manner hereinafter to be described in detail.

To support the glass sheets for movement along the path between the mold parts without interfering with the relative movements of the mold part during the bending sequence, the conveyor 18 is made up of two separate sections, an entrance section 32 disposed in advance of the mold parts 22 and 23 and a support section 33 disposed between the mold parts. The support section 33 includes rollers 34, three in the present instance, fixed to shafts 35 extending transversely across the path with their opposite ends journaled in bearings 36 carried by the framework 25 of the bending apparatus. The rollers 34 are disposed within the confines of the bars 28. The shafts 35 are joined together to rotate in unison by sprockets 37 carried by the shafts and a suitable chain (not shown) entrained therearound. To drive the rollers 34, one of the shafts 35 extends outwardly beyond the framework 25 and is connected to a suitable drive means (not shown) through a sprocket 38 on the outer end of the shaft.

The bending operation is automatically initiated by the movement of the sheets along the path and into the bending area. Thus, as the heated sheet leaves the furnace 17 and enters the bending area, its presence is detected by a sensing device 39. In the illustrated embodiment, the sensing device 39 comprises a photoelectric cell 40 disposed at one side of the path and activated by a beam of light, indicated by a broken line 41 in FIG. 1, from a lamp source 42 at the opposite side of the path. When the beam of light 41 is broken by a glass sheet, the cell 40 produces a signal which, through a conventional circuit including suitable time delay means, initiates, in timed relationship, a bending sequence in which the lower mold part 23 is moved upwardly to lift the sheet 11 off of the support section 33 of the conveyor 18 and to carry it into pressing engagement with the upper mold part 22 and thereafter to return it to the support section and then move the sheet out of the bending area B and into the cooling area C.

Raising and lowering of the lower mold part 23 toward and away from the upper mold part is effected by a suitable actuating mechanism 43 which, in the present instance comprises a simple cam and follower arrangement. As shown in FIG. 2, in the apparatus depicted, two similar cam and follower type actuating mechanisms 43 are utilized, one disposed on each side of the path but, since the mechanisms are identical in construction, a detailed description of but one will be given herein. Generally, each of these mechanisms 43 includes a cam follower 44 associated with the carriage 31 and riding on the periphery of a rotatable disk cam 45 contoured in a conventional manner to impart the desired reciprocal motion to the follower 44 and thus to the carriage 31 supporting the mold part.

The disk cam 45 of each actuating mechanism is fast on a rotatable shaft 46 disposed beneath the conveyor 18 and extending transversely across the path. The shaft 46 is journaled adjacent its opposite ends in bearings 47 to rotate about a fixed horizontal axis. One end of the shaft is coupled to a suitable drive mechanism 48 operable to rotate the shaft in response to signals from the sensing device 39.

As the cam 45 is rotated, the follower 44 rides along the developed irregular outline of the outer periphery of the cam and is thereby moved along a substantially vertical path toward and away from the axis of the shaft 46. The cam follower 44 is carried by a bar 49 depending from the carriage 31 with the upper end of the bar secured to the carriage. The cam follower 44 comprises a roller 50 journaled on one end of an arm attached at its opposite ends to the bar 49 intermediate the ends thereof and inclined downwardly toward the cam so that the roller rests on the edge of the cam and thus supports the lower mold part 23.

To guide the lower mold part 23 in its movements toward and away from the upper mold part, the bar 49 is attached to the framework 25 by links which, together with the frame and the bar constitute a four bar linkage 52 in which the links are arranged in a parallelogram. As shown in FIG. 1, the bar 49 and one of the vertical columns 26 form one pair of parallel links of the linkage 52. The other pair of parallel links comprise two elongated members 53 extending between the bar 49 and the framework 25 with one end pivoted to the bar at spaced points therealong and the opposite end attached to shafts 54 extending between the transversely aligned columns 26. The shafts 54 are journaled adjacent their opposite ends in bearings 55 carried by the columns 26 to rock about fixed, parallel, substantially horizontal axes. Since, with this type of linkage, the links of each pair remain parallel to each other at all times the bar 49 remains parallel to the vertical columns 26 throughout its endwise movements.

It will, of course, be appreciated that the bar 49 does not follow a straight line in moving toward and away from the conveyor 18 but rather follows a slightly arcuate path as it is raised and lowered by the actuating mechanism 43. However, by proper initial adjustment, proper registry between the shaping surfaces 24 on the upper and lower mold parts 22 and 23 may be obtained when the lower mold part is in its uppermost position to press the glass sheets against the upper mold.

As noted above, in accordance with the invention, the heated glass sheets 11 are lifted off of the rollers 34 of the support section 33 of the conveyor 18 as they are brought into position between the shaping surfaces 24 of the shaping mold 21 to prevent their coming to rest on the rollers of the support section. For this purpose, the lower mold part is pivoted on the carriage to move between a first position in which it is inclined downwardly toward the exit end of the furnace and a second position wherein the mold part is disposed in a substantially horizontal plane. In the first position, the lowermost side of the mold, which, when related to the direction of movement of the sheets, may be, and hereinafter will be, identified as the upstream side 56 of the mold, is disposed below the plane defined by the conveyor 18 so that the glass sheets moving along the path will pass thereover. The opposite side of the mold, the downstream side 57, projects upwardly above the plane of the conveyor into the path of the sheets so as to engage the leading end of a sheet moving along the path. As soon as the leading edge of the sheet engages the downstream side of the mold part, the latter rocks to the second position in which the downstream and upstream sides of the mold lie in a horizontal plane above the plane of the conveyor.

As shown in FIG. 1, the above-described rocking of the lower mold part is effected by supporting the base 29 on a fulcrum 58 carried by the carriage 31. The fulcrum 58, in the present instance, comprises a pedestal 59 upstanding from the carriage and having a wedge-shaped portion 60 formed on its upper end and received in a notch 61 in the undersurface of the base. The lower mold part pivots on the knife edge of the wedge-shaped portion between the first and second positions. Herein, two transversely aligned pedestals are provided, one adjacent each longitudinal side of the mold.

The mold part is balanced on the fulcrum so as to remain in the inclined or first position until the downstream side of the mold is contacted by a glass sheet. Thus, in operation, as the heated sheet moves into the bending area, it passes over the upstream side 56 of the mold part 23 and the leading edge of the sheet rides up on the bar 28 at the downstream side 57 of the mold, which bar, as shown in FIG. 1, is inclined toward the upstream side of the mold. This lifts the leading end of the sheet off of the support section 33 of the conveyor 18 and the weight of the sheet swings the mold about the fulcrum thereby bringing the upstream side of the mold into engagement with the trailing end of the sheet. By proper placement of the fulcrum 58, the balance of the mold may be regulated so that as the leading end of the sheet rides up on the bar 28 at the downstream side of the mold part, the latter swing about the fulcrum and becomes balanced thereon in the second position with the sheet supported in a substantially horizontal plane above the support rollers.

While the invention may be practiced depending on this counterbalance feature alone, in order to insure that variances in the weight of the sheet will not result in the mold failing to become properly balanced and thereby failing to lift the sheet off of the rolls, an actuator 62 operable to mechanically lift the upstream side of the mold into the horizontal sheet supporting position as the leading end of the sheet contacts the downstream side of the mold part may be provided. In the illustrated embodiment, the actuator 62 takes the form of a solenoid 63 mounted on the carriage with an armature 64 projecting toward the base 29 and attached at its upper or free end to the base. The solenoid 63 is energized in timed relationship to the movement of the sheet to move the armature upwardly as the sheet reaches the proper position between the mold parts and contacts the downstream side of the mold part thereby to rock the latter about the fulcrum into the sheet supporting position.

While the sheet has been lifted from the support rolls in the above-described manner and is supported in a horizontal plane above the conveyor as shown in full line in FIG. 3, the drive mechanism 48 for the shaft is activated to rotate the shaft 46 and the cams 45 carried thereby through one revolution which, through the medium of the follower 44, moves the lower mold part upwardly into pressing engagement with the upper mold part and then downwardly to return the bent sheet to the support section 33. The working surface of the cam 45 is so formed that after the sheet is disposed on the support section, the mold part continues to move downwardly to bring the downstream side 57 of the mold part below the plane defined by the outer periphery of the rollers 34 to permit the sheet to be moved thereover and into the chilling area C. After the bent sheet has passed out of the bending area B and as the cam 45 continues to rotate, the mold part is moved upwardly to bring the downstream side above the periphery of the support rolls and into position to receive another sheet moving along the sheet into the bending area.

Since the ring-type lower mold part 23 is designed to engage only the marginal portions of the sheet, in order to insure that the portions of the sheet inwardly of the shaping surfaces on the lower mold part will be formed to the desired curvature, the upper mold part is provided with a continuous shaping surface adapted to engage the entire upper surface of the sheet. Thus the upper mold part 22 comprises a solid member, the downwardly directed face of which comprises the curved shaping surface 24. The upper mold part is carried by a mounting frame 65 disposed above the mold part and attached to beams 66 carried by the framework 25. In order to permit adjustment of the mounting frame relative to the lower mold part, the mounting frame 65 is attached to the beams 66 by adjustable means such as rods 67 having their opposite ends threaded into tapped blocks 68 secured to the beams and to the frame. The mold part 22 is attached to the mounting frame through the medium of bolts 69 passing through a laterally projecting flange 70 formed integrally with the upper mold part 22 and through an opposed flange 71 on the mounting frame 65. The mold part is held in spaced relation to the mounting frame by resilient means such as coil springs 72 telescoped on the bolts 69 to act between the opposed faces of the flanges 70 and 71. By turning the bolts to compress or relieve the spring, the relationship between the upper mold part and the lower mold part may be adjusted.

Since the shaping surface 24 of the upper mold part 22 contacts those portions of the sheet lying within the viewing area of the completed window, any imperfections in this shaping surface which may be impressed into the heat softened glass sheet should be avoided. In other words, it is desirable that the sheet engaging surfaces of the upper mold part be smooth and that they remain in this smooth condition throughout the production run. In this connection, it will be appreciated that there are various operating conditions, inherent in the press bending operation, which have an adverse effect on the shaping surface as regards the smoothness of this surface. For example, the surface is repeatedly subjected to pressure exerted by glass sheets which are heated to an elevated temperature and this pressure and heat tends to break down the mold material and to cause imperfections in the shaping surface. In addition, it has been found that during the pressing operation a glass sheet will occasionally break due to improper heating of the sheet, defects in the sheet or other causes. In any event, the glass particles from the broken sheet tend to become embedded in or otherwise mar the shaping surface. When this occurs, it is necessary to refurbish the shaping surface on the mold part so as to avoid marring the surfaces of the glass sheets.

In accordance with another aspect of the invention, the shaping surface is maintained in a smooth condition by periodically, in effect, renewing the sheet engaging surfaces of the mold part without interrupting a production run of the sheets and without disassembling the shaping mold. To this end, the shaping surface of the mold is covered by a nonabrasive, heat resistant material 73, such as glass cloth or the like, which presents a smooth surface to the upper surface of the glass sheet and, moreover, constitutes somewhat of a cushion between the glass sheets and the mold part and means are provided for replacing this material whenever it becomes damaged by a simple procedure which may be performed while the bending apparatus is in operation.

Briefly stated, the foregoing is accomplished by providing a supply of the mold surface material 73 at one side of the mold part so that the material may be drawn across the shaping surface to replace the sheet engaging surface. Herein, the mold surface material is wound on a supply reel 74 disposed at one side of the path and extends across the path in engagement with the shaping surface on the upper mold part to a take-up reel 75 at the other side of the path. When the cover material becomes damaged or worn, an additional length of the material may be drawn from the supply reel 74 to provide an entirely new covering for the mold.

To further aid in preventing even slight imperfections in the sheet engaging surfaces from being impressed into the sheets, the surfaces may be rendered somewhat resilient by using a backing material 76 between the mold surface material 73 and the shaping surface 24. This backing material 76, since it is not in direct contact with the surface of the glass sheet, may be of a softer, more resilient and loosely woven material so as to provide greater cushioning between the glass sheet and the mold part. The backing material may be supplied in the same manner as the above-described mold surface material enabling it to be periodically replaced without interrupting the operation of the bending apparatus by drawing it from a supply reel 77 across the shaping surface and winding it onto a take-up reel 78.

In the illustrated embodiment, supply reels 74 and 77 are disposed outwardly of the mounting frame and extend longitudinally of the path. The reels are journaled one above the other on a bracket 79 secured to the framework 25. The take-up reels 75 and 78 are mounted on a similar bracket 80 at the opposite side of the path. The backing material 76 and the surface material 73 are guided off of the supply reels and onto the take-up reels by idler rolls 81 secured to the framework and riding along the inner surface of the materials 73 and 76 to guide the materials into proper relationship with the shaping surface of the upper mold part and onto the take-up rolls. To replace the mold surface material and/or the backing material, thus presenting a new surface to a glass sheet resting on the lower mold part, the take-up reels are rotated so as to wind the cover material thereon and to draw the material from the supply reels. Herein, rotation of the take-up reels is accomplished through the medium of cranks 82 attached to rolls. By providing an individual crank on each of the take-up reels, either or both of the layers of the cover material may be replaced at any time.

It will now be appreciated that a bending apparatus constructed as described above enables pressing glass sheets to precisely defined curvatures without encountering a large number of rejects due to surface imperfections in the finished windows. By preventing the glass sheets from coming to rest on the conveyor rollers, the tendency for these rollers to mar the sheets is greatly reduced if not completely eliminated. In addition, by periodically renewing the sheet engaging surfaces of the solid mold part throughout the production run, these surfaces may be maintained free from any defects which could have an adverse effect on the finished article. Further, by providing a simple means for renewing the face of the mold part without disassembling the apparatus and removing the mold part, maintaining the shaping surface in the desired condition in no way interferes with the mass production of a number of bent glass sheets by the continuous technique described herein.

It is to be understood that the form of the invention herewith shown and described is to be taken as a preferred embodiment of the same, and that various changes in the shape, size and arrangement of parts may be resorted to without departing from the spirit of the invention.

We claim:

1. In apparatus for bending glass sheets, the combination of, a conveyor for supporting and carrying the glass sheet along a predetermined substantially horizontal path, an upper mold part disposed above said predetermined path and having a downwardly directed shaping surface formed thereon, a lower mold part having an opposed complemental shaping surface formed thereon, a carriage disposed below said path and supporting said lower mold part for movement relative to said path toward and away from said upper mold part, means mounting said lower mold part on said carriage, said mounting means comprising means pivoting said lower mold part to rock about a fixed axis between an inclined position and a substantially horizontal position.

2. In apparatus for bending glass sheets, the combination of, a conveyor for supporting and carrying a glass sheet along a predetermined horizontal path, an upper mold part disposed above said predetermined path and having a downwardly directed shaping surface formed thereon, a carriage disposed below said path, a lower mold part fulcrumed on said carriage to rock about a fixed transverse axis between a first position wherein said mold is inclined downwardly relative to said path and intersecting said path and a second position wherein said mold is disposed above and parallel to said path, means for moving said carriage and said lower mold part carried thereby vertically toward and away from said upper mold part.

3. In apparatus for bending glass sheets as defined in claim 2, actuator means for rocking said lower mold part between said first and second positions.

4. In apparatus for bending glass sheets, the combination of, a shaping mold having first and second mold parts relatively movable toward and away from each other, opposed complemental rigid shaping surfaces formed on said first and second mold parts, a covering material extending entirely across and being substantially coextensive with at least one of said shaping surfaces from a substantially continuous supply disposed at one side of said shaping mold, and means on the opposite side for selectively drawing said material from said supply and across said shaping surfaces to renew the surface contacting of the sheet.

5. In apparatus for bending glass sheets, the combination of, a first mold part, a rigid shaping surface conforming in a curvature to a glass sheet when bent formed on said first mold part and adapted to engage one surface of the glass sheet, a second mold part, a complemental shaping surface formed on said second mold part and adapted to engage the opposite surface of said glass sheet, a supply reel adjacent one side of said first mold part, covering material wound on said supply reel, and means adjacent the opposite side for selectively drawing said covering material from said supply reel and for guiding the material across said shaping surface on said first mold part whereby said material entirely covers said shaping surface and is substantially coextensive therewith thereby to renew the sheet contacting surface of said first mold part.

6. In apparatus for bending glass sheets as defined in claim 5, said means for drawing said material from said supply reel comprising a take-up reel disposed adjacent the opposite side of said mold, and means for selectively rotating said take-up reel to wind the material thereon.

7. In apparatus for bending glass sheets, the combination of, a conveyor for supporting and carrying a glass sheet along a predetermined substantially horizontal path, an upper mold part disposed above said path and having a downwardly directed shaping surface formed thereon, a carriage disposed below said path, a lower mold part having a complemental upwardly directed shaping surface formed thereon, means pivoting said lower mold part on said carriage to rock about a fixed axis between a first position wherein said mold is inclined downwardly from said path and a second position wherein said mold is ispose above and parallel to said path, and means supporting said carriage for vertical movement toward and away from said upper mold part.

8. In apparatus for bending glass sheets, the combination of, a conveyor for supporting and carrying a glass sheet along a predetermined substantially horizontal path, an upper mold part disposed above said path and having a downwardly directed shaping surface formed thereon, a lower mold part having a complemental upwardly directed shaping surface formed thereon, a carriage disposed below said path, a fulcrum upstanding from said carriage to support said lower mold part, said lower mold part being adapted to rock about said fulcrum between a first position wherein said mold is inclined downwardly from said path with one side of the mold disposed in said path to engage the leading end of a glass sheet moving along said path and a second position wherein said mold is disposed above and parallel to said path thereby to support a glass sheet above said conveyor, and means for moving said carriage and said lower mold part carried thereby upwardly into pressing engagement with said upper mold part.

9. In apparatus for bending glass sheets, the combination of, a frame, a conveyor carried by said frame and operable to move a glass sheet to be bent along a predetermined substantially horizontal path, a shaping mold having upper and lower mold parts with opposed complemental shaping surfaces formed thereon, means supporting said upper mold part on said frame above said path, a carriage disposed below said path, means mounting said lower mold part on said carriage to rock about a horizontal axis extending transversely of said path between a first position wherein said mold part is inclined downwardly from said path with one side of said mold being disposed in said path and operable to engage the leading end of a sheet moving along the path, an a second position wherein said lower mold part is disposed above and parallel to said path, actuator means acting between said mold part and said carriage to rock said mold part between said first and second positions in response to the movement of a sheet along a path, and means for moving said carriage and said lower mold part carried thereby toward and away from said upper mold part.

10. In apparatus for bending glass sheets, the combination of, a shaping mold having upper and lower mold parts, a conveyor operable to move a glass sheet along a substantially horizontal path extending between said upper and lower mold parts, a downwardly directed shaping surface formed on said upper mold part, an opposed complemental shaping surface formed on said lower mold part, said lower mold part being pivoted to rock about a fixed axis extending transversely of said path between a first position wherein said mold part is inclined longitudinally of the path downwardly therefrom with said shaping surface at one transversely disposed side of said mold intersecting said path to engage the leading end of a sheet moving therealong and a second position wherein said mold is disposed above and parallel to said path and operable to support the glass sheet above said conveyor, and means supporting said lower mold part for vertical movement toward and away from said upper mold part.

11. In apparatus for bending glass sheets, the combination of, a shaping mold having upper and lower mold parts, means supporting a glass sheet between said mold parts, a substantially continuous downwardly directed shaping surface formed on said upper mold part, an opposed complemental shaping surface formed on said lower mold part, means supporting said lower mold part for vertical movement toward and away from said upper mold part thereby to lift a glass sheet into pressing engagement with said continuous shaping surface, a covering material extending across said continuous shaping surface and being substantially coextensive therewith between a supply reel disposed adjacent one side of said upper mold part and a take-up reel disposed adjacent the opposite side of said upper mold part, and means for selectively drawing said material from said supply reel to said take-up reel and across said shaping surface.

12. In apparatus for bending each of a plurality of glass sheets moving successively along a predetermined substantially horizontal path, an upper mold part disposed above said path and having a substantially continuous downwardly directed shaping surface formed thereon, a lower mold part having an opposed complemental shaping surface formed thereon, a carriage disposed below said path, means pivoting said lower mold part on said carriage to swing about an axis extending transversely across said path between a first position wherein said lower mold part is inclined downwardly from said path and a second position wherein said lower mold part is disposed above and parallel to said path, means for moving said carriage and said lower mold part carried thereby toward and away from said upper mold part thereby to lift a glass sheet into pressing engagement with said continuous shaping surface, a covering material extending from a substantially continuous supply disposed adjacent one side of said upper mold part across said continuous shaping surface and interposed between said surface and the glass sheet, and means for selectively drawing said material from said supply across said shaping surface.

References Cited
UNITED STATES PATENTS
3,077,753    2/1963    Dammers _____ 65—287 X DONALL H. SYLVESTER, *Primary Examiner.*

S. LEON BASHORE, A. D. KELLOGG,
*Assistant Examiners.*